United States Patent [19]
Ishimitsu et al.

[11] Patent Number: 5,903,865
[45] Date of Patent: May 11, 1999

[54] METHOD OF PREPARING SPEECH MODEL AND SPEECH RECOGNITION APPARATUS USING THIS METHOD

[75] Inventors: Shunsuke Ishimitsu; Ikuo Fujita, both of Kawagoe, Japan

[73] Assignee: Pioneer Electronic Corporation, Tokyo, Japan

[21] Appl. No.: 08/705,502

[22] Filed: Aug. 29, 1996

[30]     Foreign Application Priority Data

Sep. 14, 1995   [JP]   Japan ................................. 7-237142

[51] Int. Cl.$^6$ ...................................................... G10L 5/04
[52] U.S. Cl. ...................... 704/256; 704/255; 704/257; 704/243
[58] Field of Search ................... 704/256, 255, 704/257, 243; 395/21, 2.55

[56]              References Cited

U.S. PATENT DOCUMENTS

| | | | |
|---|---|---|---|
| 5,046,099 | 9/1991 | Nishimura | 381/43 |
| 5,129,002 | 7/1992 | Tsuboka | 704/256 |
| 5,307,444 | 4/1994 | Tsuboka | 704/256 |
| 5,381,513 | 1/1995 | Tsuboka | 704/256 |
| 5,390,278 | 2/1995 | Gupta | 704/256 |
| 5,506,933 | 4/1996 | Nitta | 704/256 |
| 5,649,056 | 7/1997 | Nitta | 704/256 |
| 5,655,057 | 8/1997 | Takagi | 704/247 |
| 5,657,424 | 8/1997 | Farrell | 704/266 |

FOREIGN PATENT DOCUMENTS 0 559 349   8/1993   European Pat. Off. .

OTHER PUBLICATIONS

Gauvain et al. "Bayesian Learning for Hidden Markov Model with Gaussian Mixture State Observation Densities", Speech Communication, vol. 11, No. 2/3, Jun. 1, 1992, pp. 205–213.

Patent Abstracts of Japan: vol. 095, No. 011, Dec. 26, 1995 & JP 07 230295 A (NEC), Aug. 29, 1995.

European Search Report dated Mar. 20, 1998.

*Primary Examiner*—David R. Hudspeth
*Assistant Examiner*—Daniel Abebe
*Attorney, Agent, or Firm*—Perman & Green, LLP

[57]           ABSTRACT

A speech model preparing method capable of easily preparing a new Hidden Markov Model (HMM) of an input speech with a very few number of utterances like one or two times, and a speech recognition apparatus using this method. A speech recognition apparatus uses, as a speech model, a continuous distribution type HMM defined by three parameters of a state transition probability, an average vector and a variance. The apparatus computes an average vector of an input speech to be learned, selects an HMM approximate to the input to-be-learned speech as an initial model from a registration dictionary, replaces at least an average vector of the selected HMM with the computed average vector of the to-be-learned speech and adds an obtained HMM as an HMM for the input to-be-learned speech in the dictionary.

8 Claims, 7 Drawing Sheets

FIG.1

$a_{ij}$: STATE TRANSITION PROBABILITY
$c_{ij}$: SYMBOL OUTPUT PROBABILITY

FIG. 2A

DISCRETE
DISTRIBUTION
TYPE

FIG. 2B

CONTINUOUS
DISTRIBUTION
TYPE $$c_{ij} = \frac{1}{\sqrt{(2\pi)^n |\Sigma|}} \exp\left\{-\frac{1}{2}(x-\mu)^t \Sigma^{-1}(x-\mu)\right\}$$

$\mu$ : AVERAGE VECTOR OF SYMBOL $\Sigma$ : VARIANCE OF SYMBOL

X : INPUT SPEECH (OBSERVING SYMBOL)

FIG.3

FIG.4A  INPUT SPEECH TO BE LEARNED

FIG.4B  INPUT SPEECH SIGNAL

FIG.4C  SYLLABLE RECOGNITION RESULT

FIG.4D  DICTIONARY

FIG.4E  CONNECTION OF SYLLABLE HMMs

FIG. 5A  WORD PECOGNITION RESULT    ( /MO     KU     SE     I/ )

FIG. 5B  DICTIONARY

/TAIYO/
/CHIKYU/
/SUISEI/
/MOKUSEI/
⋮
/KAIOSEI/

— 3

FIG. 5C  SELECTED WORD HMM

WORD MODEL OF /MOKUSEI/

SYLLABLE HMM

HMM OF /A/

HMM OF /N/

FIG. 7B

AVERAGE HMM

FIG. 7C

LINKED MODEL OF AVERAGE HMMs

METHOD OF PREPARING SPEECH MODEL AND SPEECH RECOGNITION APPARATUS USING THIS METHOD

BACKGROUND OF THE INVENTION

1. Field of the Invention

The present invention relates to a method of preparing a speech model using a continuous distribution type HMM (Hidden Markov Model) and a speech recognition apparatus using this method. More particularly, this invention relates to a speech model preparing method capable of preparing the HMM of a new input speech with a very few number of utterances like one or two times, and a speech recognition apparatus using this method.

2. Description of Background Information

There is a probability-model based speech recognition apparatus which uses an HMM. This HMM is a Markov model which has a plurality of statuses linked with a state transition probability and is characterized by outputting a predetermined symbol in accordance with a symbol output probability when the status changes from one state to another. Generally, speech recognition uses a left-to-right model which does not involve reverse time sequence.

This speech recognition apparatus using such an HMM is designed to prepare HMMs for all the words to be recognized and register them in a dictionary in advance. At the time of speech recognition, the speech recognition apparatus sequentially reads HMMs from the dictionary, computes the probability (likelihood) of outputting the same observing symbol series as the input speech for each HMM, and outputs a word corresponding to the HMM which gives the highest probability, as the recognition result.

Figure 1:
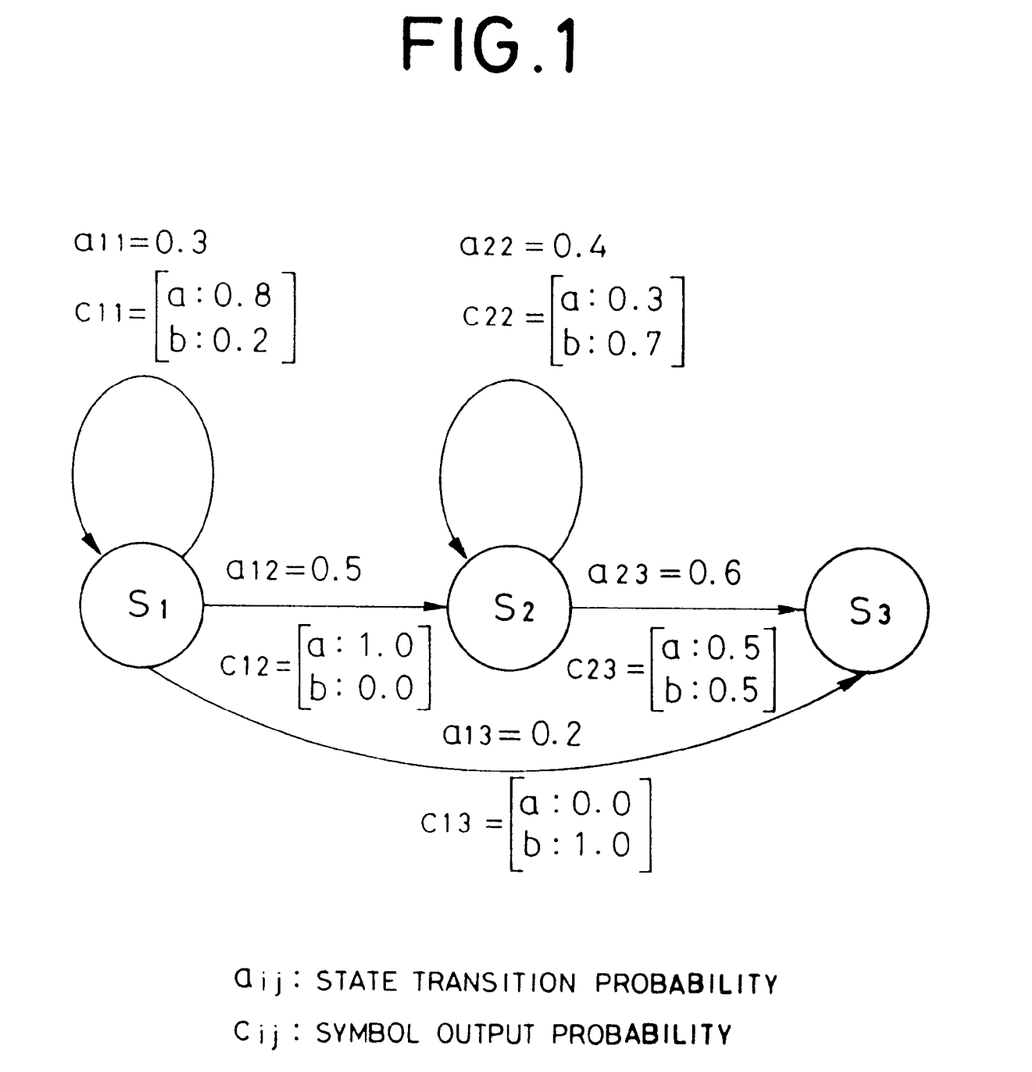
FIG. 1 is a diagram for explaining the principle of HMM-based speech recognition.

FIG. 1 exemplifies an HMM, which can output two symbols a and b and has three internal statuses $S_1$ to $S_3$. The status starts from $S_1$ and ends at $S_3$. The lines with arrowheads connecting the individual statuses $S_1$–$S_3$ represent the state transitions, and $a_{ij}$ along each arrow line indicates the state transition probability while $c_{ij}$ indicates the symbol output probability then. The upper element in the parentheses "[]" in the symbol output probability $c_{ij}$ is the output probability of the symbol a, and the lower element is the output probability of the symbol b.

Given that the observing symbol series of the input speech is (aab), the probability (likelihood) that the HMM in FIG. 1 outputs this observing symbol series (aab) is computed as follows (see "Markov Model Based Voice Recognition", by Masaaki Okouchi, Journal of Electronic Information Communication Society of Japan, April 1987, for example).

The syllables in the observing symbol series (aab) have three lengths /a/a/b/, so that the change or transition paths which allow the observing symbol series (aab) to be output for the HMM in FIG. 1 are limited to three routes: $S_1 \rightarrow S_1 \rightarrow S_2 \rightarrow S_3$, $S_1 \rightarrow S_2 \rightarrow S_2 \rightarrow S_3$, and $S_1 \rightarrow S_1 \rightarrow S_1 \rightarrow S_3$.

Because the probability that the observing symbol series (aab) is output for each transition path is expressed by all the products of the state transition probability $a_{ij}$ and the symbol output probability $c_{ij}$ along that transition path, the probabilities for the three transition paths take the following values.

For $S_1 \rightarrow S_2 \rightarrow S_2 \rightarrow S_3$, 0.3×0.8×0.5×1.0×0.6×0.6=0.036

For $S_1 \rightarrow S_2 \rightarrow S_2 \rightarrow S_3$, 0.5×1.0×0.4×0.3×0.6×0.5=0.018

For $S_1 \rightarrow S_1 \rightarrow S_1 \rightarrow S_3$, 0.3×0.8×0.3×0.8×0.2×1.0=0.01152

Since any of the three transition paths can output the observing symbol series (aab), the sum of those three probabilities, 0.036+0.018+0.01152=0.06552, becomes the probability (likelihood) of outputting the observing symbol series (aab) for the HMM in FIG. 1. For simplicity, the maximum value, "0.036", in the computed three probabilities may be treated as the probability for that HMM.

The input speech can be recognized by performing this probability computation for all the HMMs registered in the dictionary and outputting a word corresponding to the HMM that gives the highest value in the computed probabilities as the recognition result.

Figure 2A:
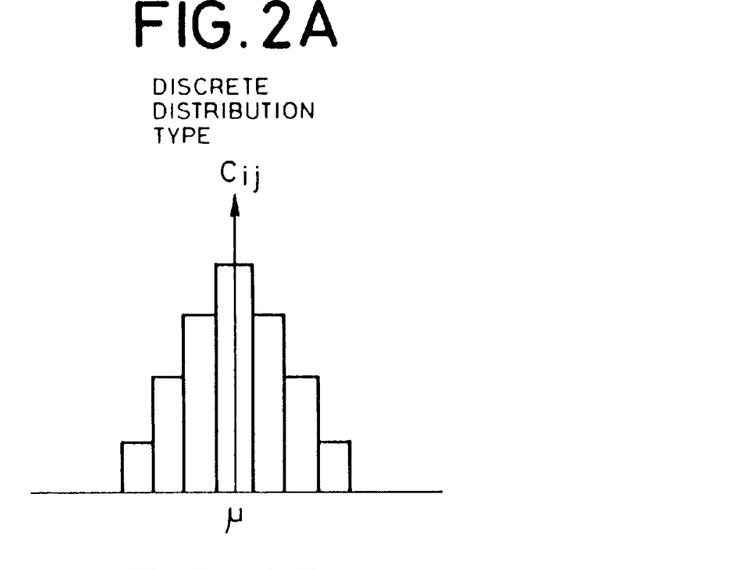
FIGS. 2A and 2B are diagrams showing a discrete distribution type HMM and a continuous distribution type HMM.
Figure 2B:
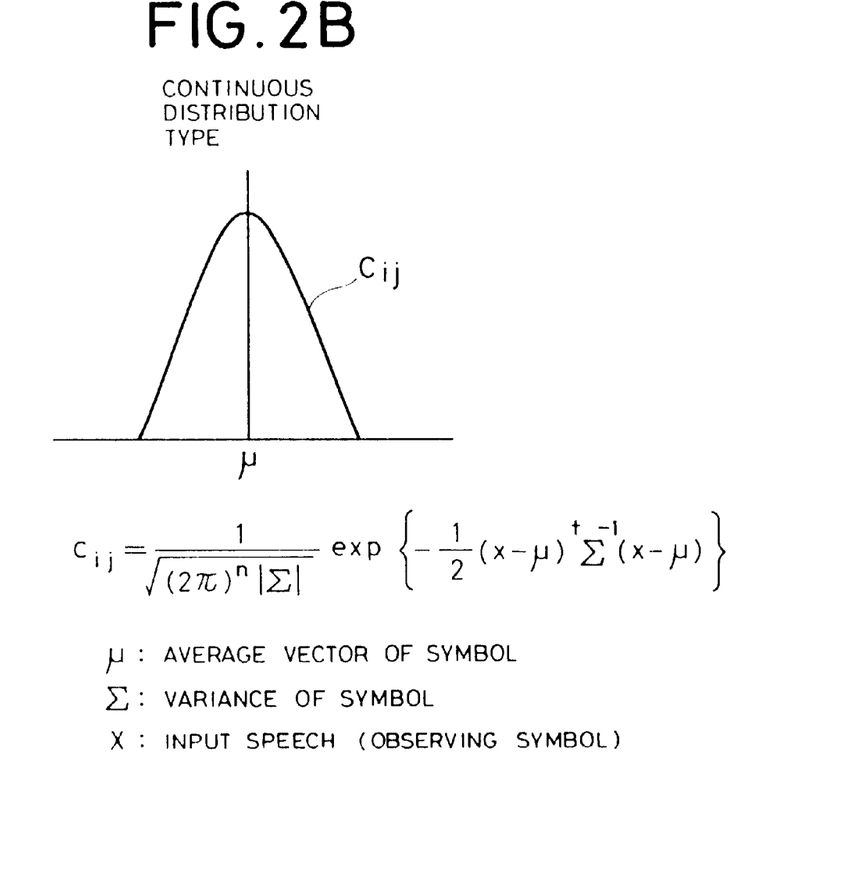

As shown in FIGS. 2A and 2B, there are a discrete distribution type HMM for which the symbol output probability $c_{ij}$ changes discontinuously and a continuous distribution type HMM for which the symbol output probability $c_{ij}$ changes continuously. Because discrete distribution type HMMs are accompanied with a quantization error, continuous distribution type HMMs are frequently used in speech recognition.

It is apparent from FIG. 2B that the symbol output probability $c_{ij}$ for the continuous distribution type is defined by the average vector $\mu$ and a variance $\Sigma$ of a symbol. Therefore, a continuous distribution type HMM is entirely described by three parameters: the state transition probability $a_{ij}$ (see FIG. 1), the average vector $\mu$ and the variance $\Sigma$.

To prepare an HMM for each registered word, learning should be performed using many samples in a population representing a speech model to predict the associated three parameters. As the method for this prediction, there are known several algorithms which include forward and backward algorithms.

With regard to the computation of the probability that an HMM exemplified in FIG. 1 outputs the observing symbol series (aab), there are likewise known several algorithms which include the forward algorithm and Viterbi algorithm.

As the HMM-based speech recognition apparatus executes speech recognition using the above-discussed probability scheme, it is excellent as a speech recognition apparatus for unspecific speakers and is being adapted in various fields, such as a voice command system in a vehicular navigation apparatus.

However, the current HMM-based speech recognition apparatus is not yet complete and causes a recognition error or recognition failure when words not registered in the dictionary are input or when uttered words, even if registered in the dictionary, are very different from standard patterns.

When a recognition error or recognition failure occurs, it is necessary to prepare a new HMM for that input speech and add it in the dictionary in order to enable the recognition of that input speech next time. According to the conventional learning method, however, a single word should be uttered ten to twenty times to predict the three parameters, namely the state transition probability, average vector and variance, and prepare a new HMM for the input speech. This method requires a great deal of efforts and time to register each additional word.

If the registration of additional words takes a lot of efforts and time, it is difficult to learn while an automobile or the like are running so that the vehicle should be stopped every time additional registration is needed. When a user is in a hurry, additional registration is carried out long after, so that the user may forget the input speech (word) to be additionally registered or may even forget the task of adding the word itself.

SUMMARY OF THE INVENTION

Accordingly, it is an objective of the present invention to provide a speech model preparing method capable of easily preparing a new HMM of an input speech with a very few number of utterances like one or two times, and a speech recognition apparatus using this method.

To achieve the foregoing object, the present invention is designed as follows.

The first aspect of this invention relates to a method of preparing a speech model comprised of a continuous distribution type HMM defined by three parameters of a state transition probability, an average vector and a variance, comprises the steps of computing an average vector of an input speech to be learned and selecting an HMM approximate to the input to-be-learned speech as an initial model from a registration dictionary; and replacing at least an average vector of the selected HMM with the computed average vector of the to-be-learned speech to yield an HMM for the input to-be-learned speech.

The second aspect of this invention relates to a method of preparing a speech model comprised of a continuous distribution type HMM defined by three parameters of a state transition probability, an average vector and a variance, comprises the steps of preparing an average HMM as an initial model using a plurality of HMMs registered in a dictionary; computing an average vector of an input speech to be learned; and replacing at least an average vector of the average HMM with the computed average vector of the to-be-learned speech to yield an HMM for the input to-be-learned speech.

The third aspect of this invention relates to a speech recognition apparatus using, as a speech model, a continuous distribution type HMM defined by three parameters of a state transition probability, an average vector and a variance, comprises average vector computing means for computing an average vector of an input speech to be learned; HMM selecting means for selecting an HMM approximate to the input to-be-learned speech as an initial model from a registration dictionary; and HMM preparing means for replacing at least an average vector of the selected HMM with the computed average vector of the to-be-learned speech and adding an obtained HMM as an HMM for the input to-be-learned speech in the dictionary.

The fourth aspect of this invention relates to a speech recognition apparatus using, as a speech model, a continuous distribution type HMM defined by three parameters of a state transition probability, an average vector and a variance, comprises average vector computing means for computing an average vector of an input speech to be learned; and HMM preparing means for preparing an average HMM as an initial model using a plurality of HMMs registered in a dictionary, replacing at least an average vector of the average HMM with the average vector of the to-be-learned speech computed by the average vector computing means, and adding an obtained HMM as an HMM for the input to-be-learned speech in the dictionary.

As mentioned earlier, a continuous distribution type HMM is described by three parameters of the state transition probability $a_{ij}$, the average vector $\mu$ and the variance $\Sigma$. Of the three parameters, the average vector $\mu$ significantly varies depending on an input speech while the variance $\Sigma$ which gives the distribution pattern of the symbol output probability is not changed so much by the input speech. While HMMs for many input speeches have already been registered in the dictionary, they include an HMM whose pattern is very similar to that of an input speech to be newly added in the dictionary.

In adding a new HMM for an input speech whose recognition has resulted in an error or has failed, therefore, unlike the conventional method of preparing that HMM from scratch, this invention selects an HMM whose pattern is very similar to that of the speech model of the input speech to be learned, from the HMMs already registered in the dictionary and replaces only the average vector of the selected HMM with the average vector of the to-be-learned speech which is to be newly added in the dictionary, thereby preparing a new HMM for the input speech.

Through the studies conducted, the present inventors found that high recognition is acquired by preparing an average HMM using many HMMs already registered in the dictionary and replacing only the average vector of this average HMM with the average vector of a to-be-learned speech which is to be newly added in the dictionary.

Based on this finding, the present inventors have designed this invention to prepare an average HMM using a plurality of HMMs (e.g., all the HMMs) registered in a dictionary, prepare this average HMM as an initial model in the dictionary, and replace only the average vector of the average HMM with the computed average vector of the to-be-learned speech which is to be newly added in the dictionary, to thereby yield a new HMM for the input to-be-learned speech.

Because this invention employs the above-described various schemes, a new HMM for any input speech whose recognition has resulted in an error or has failed can be prepared with a very few number of utterances like one or two times. This can significantly simplify the task of additionally registering a new HMM for an input speech as compared with the prior art, so that the present apparatus, even when installed in an automobile or the like, can easily add such a new HMM while the vehicle is running.

DETAILED DESCRIPTION OF THE PREFERRED EMBODIMENT

A preferred embodiment of the present invention will be now described with reference to the accompanying drawings.

Figure 3:
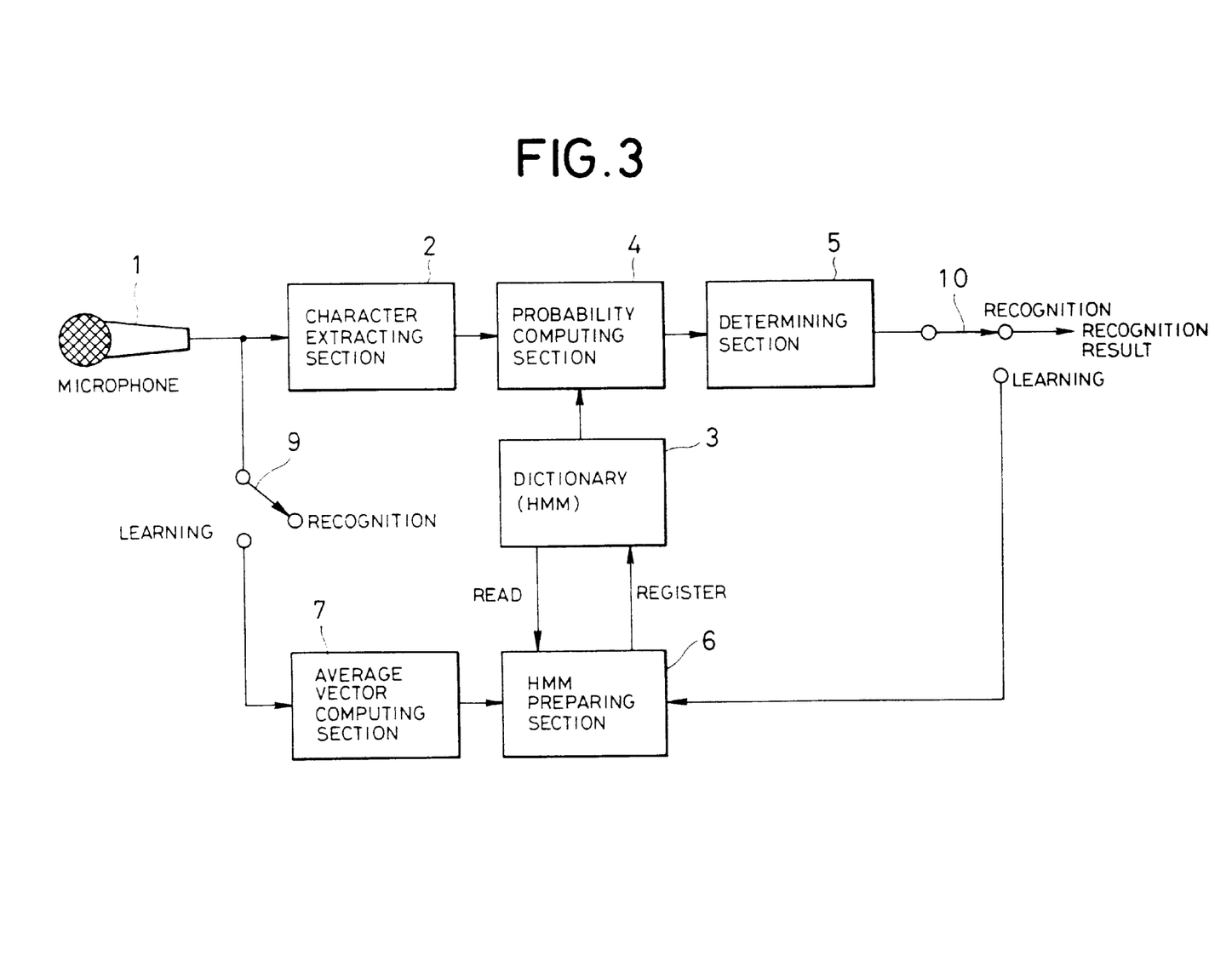
FIG. 3 is a block diagram showing the first example of a speech recognition apparatus embodying this invention.

FIG. 3 shows the first example of a speech recognition apparatus embodying this invention.

The first example is designed to execute speech recognition of an input speech to be learned to select an HMM which is most likely the speech model of the to-be-learned speech from a registration dictionary, and replace the average vector of the selected HMM with the average vector of the to-be-learned speech, thereby producing a new HMM.

In FIG. 3, the speech recognition apparatus includes a microphone 1 for inputting speeches, a character extracting section 2 for analyzing an input speech and converting it to a predetermined observing symbol series, a dictionary 3 which has stored HMMs for individual words, a probability computing section 4 for computing a probability (likelihood) for each HMM, which produces an observing symbol series, and a determining section 5 for selecting an HMM which gives the highest probability from those HMMs for which the probability computation has been performed and outputting a word corresponding to that HMM as the recognition result. The microphone 1, the character extracting section 2, the dictionary 3, the probability computing section 4 and the determining section 5 constitute a known speech recognition apparatus having no learning function. Such a known speech recognition apparatus is disclosed, for example, in Japanese Patent Kokai (laying open) No. 6-12091.

In addition to the above structure, the speech recognition apparatus according to this invention has an HMM preparing section 6 for preparing an HMM for a new word and a average vector computing section 7 for computing the average vector of an input speech to be learned.

FIG. 3 illustrates the speech recognition apparatus embodying this invention in the form of functional blocks. In the actual apparatus, the circuit portions excluding the microphone 1 and the dictionary 3 are constituted of a microcomputer, a DSP (Digital Signal Processor) or the like, and their circuit functions are accomplished in the form of software by programs.

To begin with, the ordinary speech recognition apparatus will be discussed briefly. When a user utters a predetermined word, registered in the dictionary 3, toward the microphone 1, the character extracting section 2 extracts the input speech signal at the proper window length (frame), converts the input speech signal to a predetermined observing symbol (e.g., tenth order ?melkepstrum) for each frame and sends the observing symbols to the probability computing section 4.

The probability computing section 4 sequentially reads all the HMMs registered in the dictionary 3 and sequentially computes the probabilities (likelihoods) of producing the observing symbol series for the respective HMMs.

When the computation of the probabilities for all the HMMs registered in the dictionary 3 is completed, the determining section 5 selects the HMM with the highest probability among the acquired probabilities and outputs a word corresponding to the selected HMM as the recognition result. This completes the recognition of the speech entered through the microphone 1.

When the known speech recognition apparatus is used in the above manner, some words uttered may not be recognized at all or may be recognized erroneously even they are repeatedly uttered. Further, it may become necessary to additionally register new words unregistered in the dictionary 3. The speech recognition apparatus according to this invention is designed to be able to prepare a new HMM for an input speech and add it in the dictionary in the following manner in such a case.

The process of preparing an HMM for a new word in the speech recognition apparatus will be now described with reference to FIGS. 4A through 4E.

FIGS. 4A–4E exemplify a method of selecting an HMM which is the most closest to the input speech to be learned from the dictionary through speech recognition and preparing an HMM for the new input speech (word) using the selected HMM as an initial model. An input speech to be learned is recognized in the unit of connected syllables (e.g., syllables /mo/ku/te/ki/chi for a Japanese word "mokutekichi" equivalent to the English word "destination"; this scheme will be hereunder called "connected syllable recognition scheme), or is recognized word by word (e.g., /mokutekichi/; this scheme will be hereunder called "word recognition scheme"). The former scheme may be able to use not only syllables, but also half syllables or phonemes or a combination of those three. FIG. 4 shows the case where the connected syllable recognition scheme is used.

Switches 9 and 10 are set to the learning sides. Suppose that a new word to be additionally registered is "mokutekichi" ("destination" in English). When a speaker utters /mokutekichi/ to the microphone 1 (FIG. 4A), this input speech signal (FIG. 4B) is sent to the character extracting section 2 to be extracted at the proper window length (frame) and to be converted to a predetermined observing symbol (e.g., tenth order ?melkepstrum) for each frame. The acquired observing symbols are then sent to the probability computing section 4.

Figure 4A:
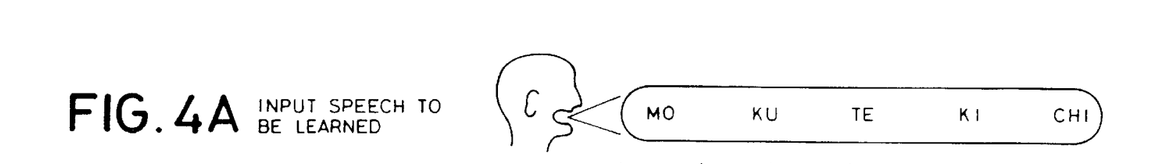
FIGS. 4A through 4E are explanatory diagrams for a method of preparing a speech model using a connected syllable recognition scheme.
Figures 4B, 4C:
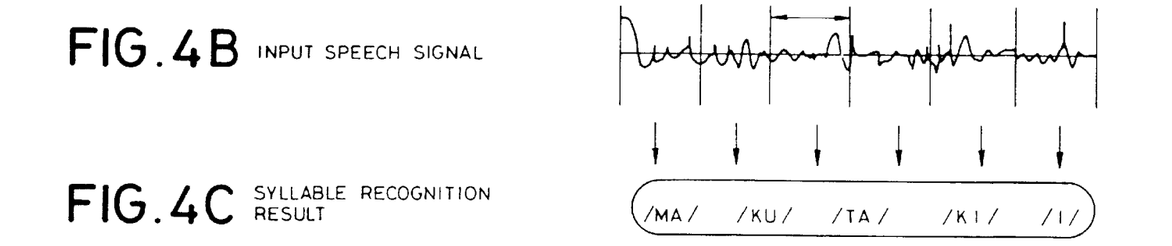
Figure 4D:
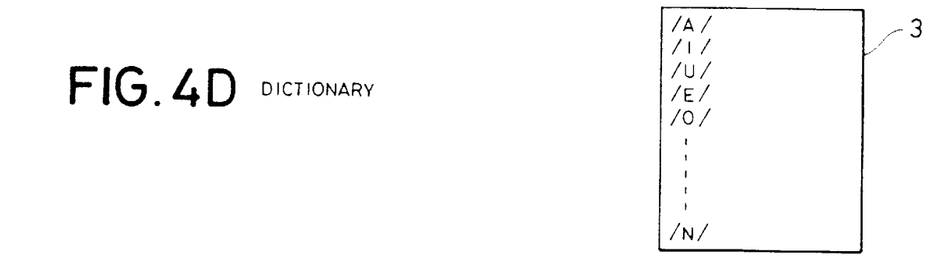

The probability computing section 4 sequentially reads all the HMMs registered in the dictionary 3 and sequentially computes the probabilities for the individual HMMs to produce the individual symbols in the observing symbol series for the to-be-learned speech. Specifically, the probability computing section 4 computes the probability that each of the HMMs for all the necessary syllables /a/ to /n/ (about 110 syllables for Japanese), registered in the dictionary 3 as shown in FIG. 4D, produces the associated one of the symbols in the observing symbol series. The dictionary 3 should store syllables, half syllables or phonemes, or a combination of those three in accordance with the recognition unit.

The determining section 5 selects an HMM which gives the highest probability for each symbol. Suppose that the to-be-learned input speech /mokutekichi/ has been recognized as /ma/ku/ta/ki/i/ as shown in FIG. 4C, through the above-described determination process. The determining section 5 sends this determination result to the HMM preparing section 6. The probability computing section 4 and the determining section 5 constitute HMM selecting means.

The HMM preparing section 6 reads HMMs for the individual selected syllables, namely, an HMM for the syllable /ma/, an HMM for the syllable /ku/, an HMM for the syllable /ta/, an HMM for the syllable /ki/ and an HMM for the syllable /i/, from the dictionary 3. The HMM preparing section 6 then arranges and connects those HMMs of the five syllables in a time sequential order to prepare an HMM connected model for the to-be-learned input speech as shown in FIG. 4E.

The average vector computing section 7 computes the average vector of the to-be-learned input speech and sends it to the HMM preparing section 6.

Figure 4E:
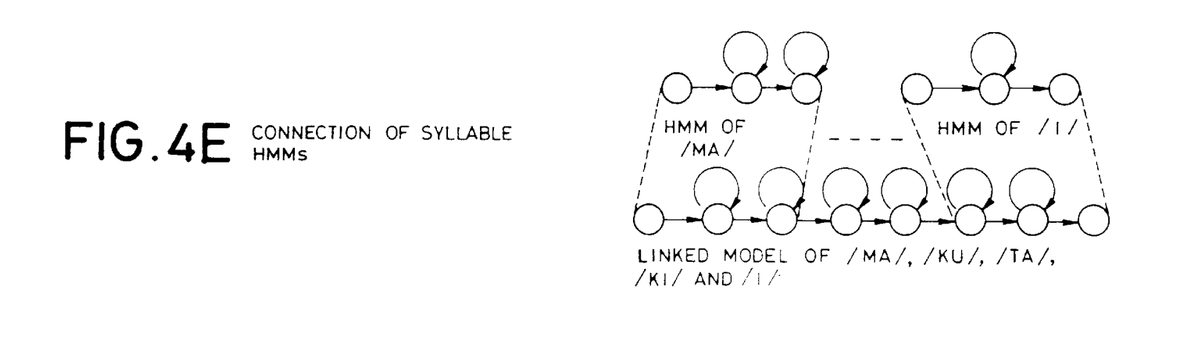

The HMM preparing section 6 replaces the received average vector with the average vector of the HMM connected model shown in FIG. 4E. This newly prepared HMM is added in the dictionary 3 as a new HMM for the to-be-learned speech /mokutekichi/.

Figure 5A:
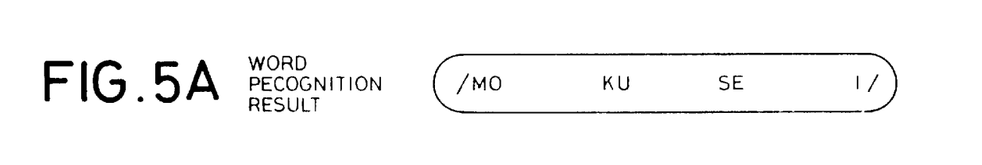
FIGS. 5A through 5C are explanatory diagrams for a method of preparing a speech model using a word recognition scheme.
Figure 5B:
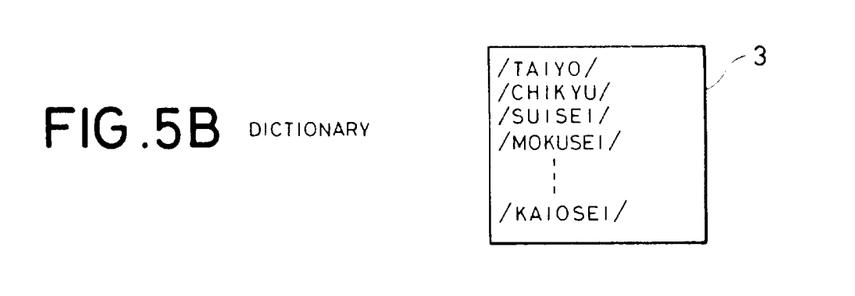
Figure 5C:
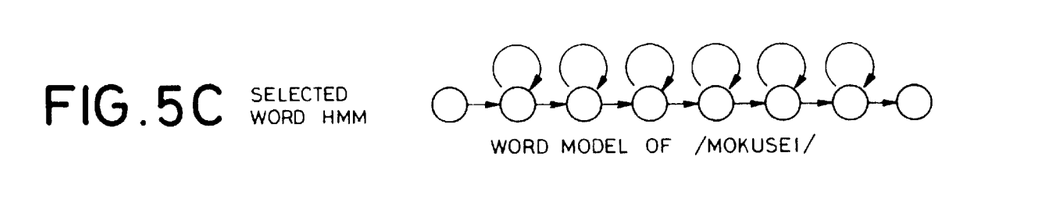

FIGS. 5A through 5C exemplifies how to prepare an HMM using the word recognition scheme.

FIGS. 5A–5C show the case where the probability computing section 4 and the determining section 5 have performed speech recognition on the to-be-learned input speech /mokutekichi/ on the word base and have selected a word /mokusei/ ("Jupiter" in English) as the most likely HMM (FIG. 5A).

In this case, the HMM preparing section 6 reads the HMM of the word /mokusei/ (FIG. 5C) from the dictionary 3 (FIG. 5B) and replaces only the average vector of this word model with the average vector of the to-be-learned speech, which has been computed by the average vector computing section 7, to prepare a new HMM for the to-be-learned input speech /mokutekichi/.

When this word recognition scheme is used, the speech recognition is performed word by word in the probability computing section 4 and the determining section 5, making the recognition time shorter than that in the connected syllable recognition scheme illustrated in FIGS. 4A–4E. An HMM for a new word can therefore be prepared in a shorter time.

Figure 6:
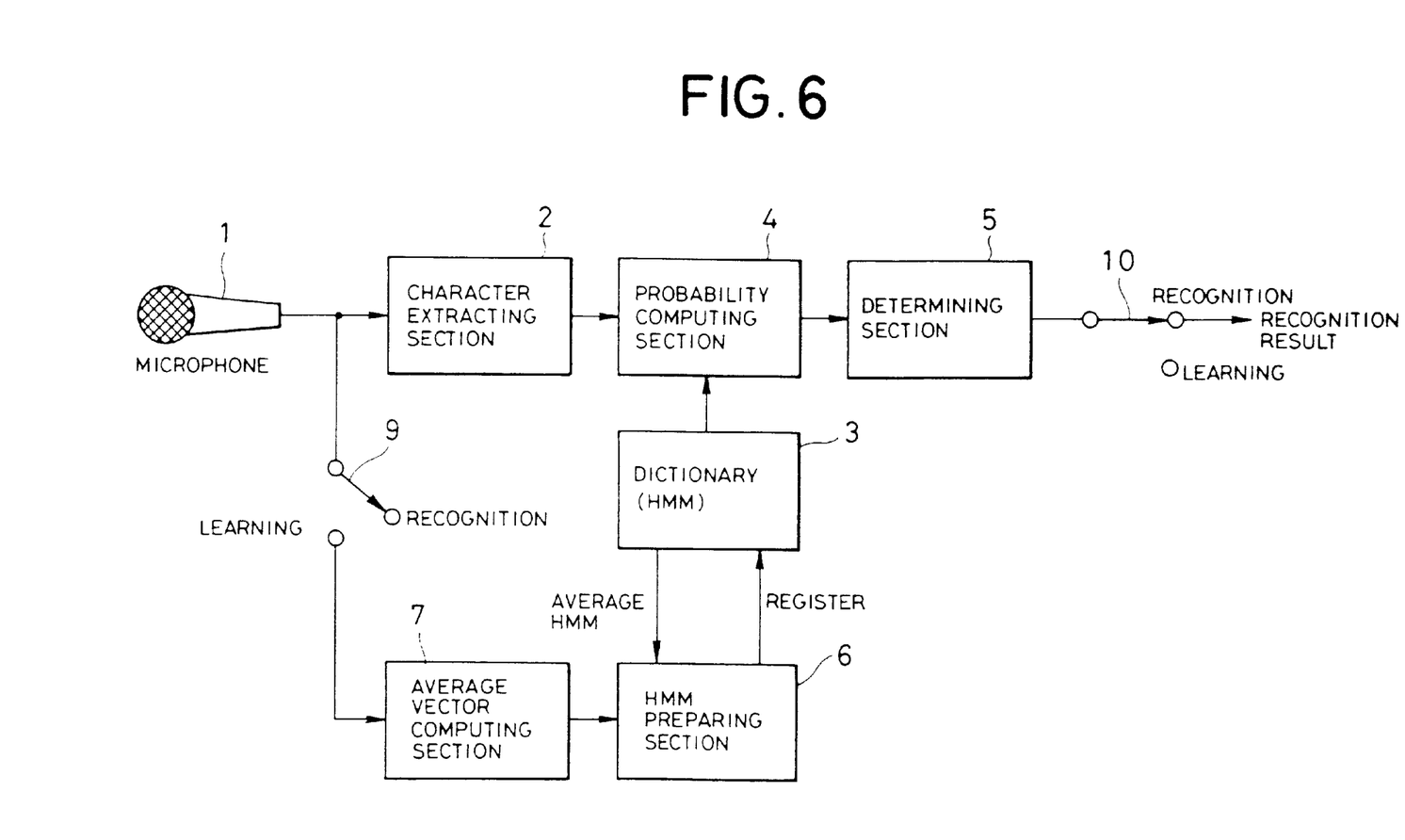
FIG. 6 is a block diagram showing the second example of a speech recognition apparatus embodying this invention.

FIG. 6 shows the second example of a speech recognition apparatus embodying this invention.

This second example is designed such that a single average HMM with averaged parameters is prepared as an initial model from the HMMs of all the syllables registered in the dictionary, and only the average vector of the average HMM is replaced with the average vector of a to-be-learned speech, which is to be newly added in the dictionary, thereby producing the HMM for the new word. This scheme is hereinafter called "average HMM scheme".

FIG. 6, as in the case of FIG. 3, illustrates the speech recognition apparatus embodying this invention in the form of functional blocks. In the actual apparatus, the circuit portions excluding the microphone 1 and the dictionary 3 are constituted of a microcomputer, a DSP (Digital Signal Processor) or the like, and their circuit functions are accomplished in the form of software by programs.

The speech recognition apparatus in FIG. 6 differs from the one shown in FIG. 3 in that the learning-side end of the switch 10 is open and an average HMM is prepared in advance in the dictionary 3 as an initial model, instead of feeding back the speech recognition result obtained by the probability computing section 4 and the determining section 5.

Figure 7A:
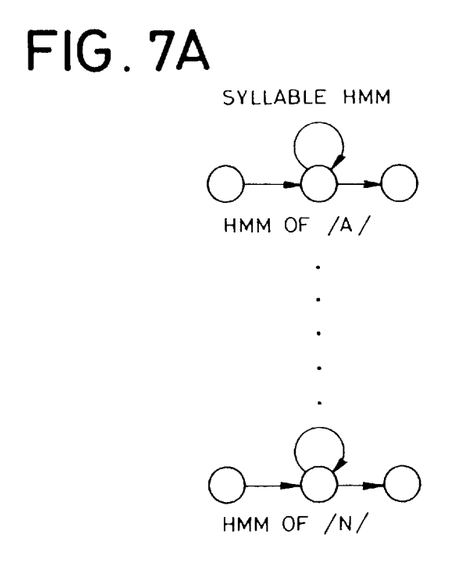
FIGS. 7A through 7C are explanatory diagrams for a method of preparing a speech model using an average HMM scheme.
Figure 7B:
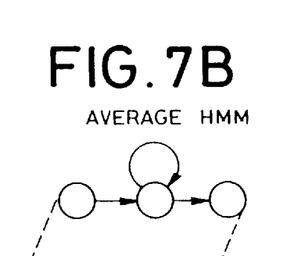

With the speech recognition apparatus in FIG. 6 in use, the probability computing section 4 computes the probability that each of the HMMs for all the syllables /a/ to /n/ (about 110 syllables for Japanese), registered in the dictionary 3 as shown in FIG. 7A, is used to acquire the averages of the state transition probability, the average vector and the variance, and a single average HMM as shown in FIG. 7B, which is defined by those three averaged parameters, is prepared in advance in the dictionary 3 as an initial model. Although syllables are used in this case, half syllables or phonemes may be used as well.

The process of preparing an HMM for a new word in the thus constituted speech recognition apparatus shown in FIG. 6 will now be described with reference to FIGS. 7A through 7C.

Suppose that a new word to be additionally registered is "mokutekichi" ("destination" in English) as in the first example. When a speaker utters /mokutekichi/ to the microphone 1, the average vector computing section 7 computes the average vector of the input speech and sends it to the HMM preparing section 6.

Figure 7C:
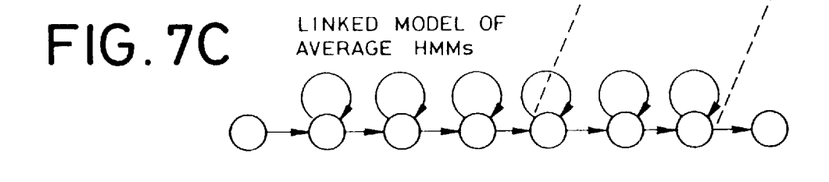

The HMM preparing section 6 reads the average HMM in FIG. 7B as the initial model from the dictionary 3, connects a predetermined number of the average HMMs as shown in FIG. 7C, replaces the average vector of the resultant linked model of the average HMMs with the average vector sent from the average vector computing section 7 to thereby prepare an HMM for the to-be-learned input speech /mokutekichi/, and adds this HMM in the dictionary 3.

Because the average HMM scheme does not involve recognition of an input speech, it can prepare an HMM for a new word more quickly than the connected syllable recognition scheme and the word recognition scheme.

Table 1 shows actual measurements on the time for predicting (learning) a new HMM in the speech recognition apparatus embodying this invention.

TABLE 1

|  | Recognition Time | HMM Linkage | Average Vector Computation | Total Time |
| --- | --- | --- | --- | --- |
| Connected syllable recognition scheme | 9.1 sec | 9.2 sec | 7.4 sec | 16.7 sec |
| Word recognition scheme | 1.2 | — | 7.4 | 7.6 |
| Average HMM scheme | — | 0.2 | 7.4 | 7.6 |

Note 1:
A total of 110 syllables were recognized in the connected syllable recognition scheme.
Note 2:
A total of 30 words were recognized in the word recognition scheme.

As is apparent from Table 1, because of no need for the speech recognition of an input word, the average HMM scheme takes a shorter learning time than the connected syllable recognition scheme and the word recognition scheme. The word recognition scheme, which requires no syllable recognition, takes a shorter learning time than the connected syllable recognition scheme.

Table 2 shows percentage of the recognition when the speech recognition of a new word was performed using the HMM acquired through the learning illustrated in Table 1. Table 2 also shows the recognition ratios in the conventional learning method.

TABLE 2

|  | Percentage of recognition | |
| --- | --- | --- |
|  | Uttered Once | Uttered Twice |
| This invention | | |
| Connected syllable recognition scheme | 95.6% | 96.7% |
| Word recognition scheme | 85.6% | 94.4% |
| Average HMM scheme | 87.2% | 96.7% |
| Conventional Learning | 30.0% | 52.2% |

Note:
The forward and backward algorithms were used in the conventional learning method.

It is apparent from Table 2 that when a word is uttered once or twice, the conventional learning method does not accomplish the proper parameter prediction and does not predict the optimal model, resulting in a very poor percentage of recognition. According to the connected syllable recognition scheme of this invention, the recognition ratio through one learning becomes 95.6% which shows that single learning is sufficient for the recognition. The word recognition scheme and the average HMM scheme do not achieve the sufficient percentage of recognition through single learning but requires two or more learning processes for the sufficient percentage of recognition.

In consideration of what is shown in Tables 1 and 2, when the number of utterances is set to one, the connected syllable recognition scheme is superior, while with the number of utterances set to two, the average HMM scheme is superior from the viewpoint of a shorter learning time (see Table 1). In designing the speech recognition apparatus of this invention, therefore, the proper one of the three schemes which meets the purpose in consideration of the environment and conditions under which the apparatus is to be used should be employed.

When the connected syllable recognition scheme is used, it is not so easy to recognize how many syllables an input word has. In this case, therefore, the number of syllables should be previously determined in accordance with an input word and automaton should be used. When the average HMM scheme is used, the number of the average HMMs to be linked (FIG. 7C) may be fixed (e.g., the number of statuses S=12).

Although the foregoing description of this embodiment has been given with reference to the case where only the average vector of an HMM is replaced with the average vector of the to-be-learned speech, the state transition probability in the three parameters which has the second greatest variation to that of the average vector may be recomputed for replacement for the average vector of the to-be-learned speech. In this case, no calculation is performed for the remaining parameter, "variance", a new HMM can be prepared more quickly by the time otherwise needed for the calculation for the variance.

Although various examples of the speech recognition apparatus of the present invention have been described herein, it should be apparent to those skilled in the art that the present invention is not limited to those discussed above and may be modified in various other forms without departing from the spirit or scope of the invention.

In the method according to the first aspect of this invention, as described above, an HMM close to an input speech to be learned is selected from the registration dictionary and at least the average vector of the selected HMM is replaced with the average vector of the to-be-learned speech to thereby acquire a new HMM. This method can therefore easily prepare a new HMM for the input speech with a very few number of utterances like one or two times.

In the method according to the second aspect of this invention, an average HMM prepared from a plurality of HMMs registered in the dictionary is provided as an initial model and at least the average vector of this average HMM is replaced with the average vector of the to-be-learned speech to thereby acquire a new HMM. This method can therefore shorten the time for preparing a new HMM.

The speech recognition apparatus according to the third aspect of this invention comprises average vector computing means for computing an average vector of an input speech to be learned; HMM selecting means for selecting an HMM approximate to the input to-be-learned speech as an initial model from a registration dictionary; and HMM preparing means for replacing at least an average vector of the selected HMM with the computed average vector of the to-be-learned speech and adding an obtained HMM as an HMM for the input to-be-learned speech in the dictionary. With this structure, a new HMM for any input speech can easily be prepared for additional registration in the dictionary with a very few number of utterances like one or two times. Even when this speech recognition apparatus is installed in an automobile or the like, therefore, it is easy to additionally register a new HMM while the vehicle is running.

The speech recognition apparatus according to the fourth aspect of this invention comprises average vector computing means for computing an average vector of an input speech to be learned; and HMM preparing means for preparing an average HMM as an initial model using a plurality of HMMs registered in a dictionary, replacing at least an average vector of the average HMM with the average vector of the to-be-learned speech computed by the average vector computing means, and adding an obtained HMM as an HMM for the input to-be-learned speech in the dictionary. This apparatus can therefore prepare a new HMM more quickly.

What is claimed is:

1. A method of recognizing speech from a reduced number of utterances of the speech by use of a speech model comprised of a continuous distribution type Hidden Markov Model (HMM) defined by three parameters of a state transition probability, an average vector and a variance, comprising the steps of:

computing an average vector of an input speech to be learned and selecting a Hidden Markov Model approximate to said input to-be-learned speech as an initial model from a registration dictionary;

replacing an average vector of said selected Hidden Markov Model with said computed average vector of said to-be-learned speech and maintaining a variance of said selected Hidden Markov Model unchanged to yield a Hidden Markov Model for said input to-be-learned speech; and employing said computed average vector for recognition of the speech.

2. A method of recognizing speech from a reduced number of utterances of the speech by use of a speech model comprised of a continuous distribution type Hidden Markov Model (HMM) defined by three parameters of a state transition probability, an average vector and a variance, comprising the steps of:

preparing an average Hidden Markov Model as an initial model using a plurality of Hidden Markov Models registered in a dictionary;

computing an average vector of an input speech to be learned; and replacing at least an average vector of said average HMM with said computed average vector of said to-be-learned speech and maintaining a variance of said selected Hidden Markov Model unchanged to yield a Hidden Markov Model for said input to-be-learned speech; and employing said computed average vector for recognition of the speech.

3. A speech recognition apparatus using, as a speech model, a continuous distribution type Hidden Markov Model (HMM) defined by three parameters of a state transition probability, an average vector and a variance, comprising:

average vector computing means for computing an average vector of an input speech to be learned;

HMM selecting means for selecting a Hidden Markov Model approximate to said input to-be-learned speech as an initial model from a registration dictionary; and HMM preparing means for replacing an average vector of said selected Hidden Markov Model with said computed average vector of said to-be-learned speech, maintaining a variance of said selected Hidden Markov Model unchanged, and adding an obtained Hidden Markov Model as a further Hidden Markov Model for said input to-be-learned speech in said dictionary.

4. A speech recognition apparatus using, as a speech model, a continuous distribution type Hidden Markov Model (HMM) defined by three parameters of a state transition probability, an average vector and a variance, comprising:

average vector computing means for computing an average vector of an input speech to be learned; and HMM preparing means for preparing an average Hidden Markov Model as an initial model using a plurality of HMMs registered in a dictionary, replacing an average vector of said average Hidden Markov Model with said average vector of said to-be-learned speech computed by said average vector computing means, maintaining a variance of said selected Hidden Markov Model unchanged, and adding an obtained Hidden Markov Model as a Hidden Markov Model for said input to-be-learned speech in said dictionary.

5. A method as claimed in claim 1, further comprising a step of computing a state transition probability of said input speech to be learned, wherein said step of replacing includes a step of replacing said state transition probability of said selected Hidden Markov Model with said computed state transition probability of said to-be-learned speech.

6. A method as claimed in claim 2, further comprising a step of computing a state transition probability of said input speech to be learned, wherein said step of replacing includes a step of replacing said state transition probability of said average HMM with said computed state transition probability of said to-be-learned speech.

7. An apparatus as claimed in claim 3, further comprising a means for computing a state transition probability of said input speech to be learned, wherein said HMM preparing means replaces said state transition probability of said selected Hidden Markov Model with said computed state transition probability of said to-be-learned speech.

8. An apparatus as claimed in claim 4, further comprising a means for computing a state transition probability of said input speech to be learned, wherein said HMM preparing means replaces said state transition probability of said average HMM with said computed state transition probability of said to-be-learned speech.

* * * * *